3,003,214
SAFETY HOOK

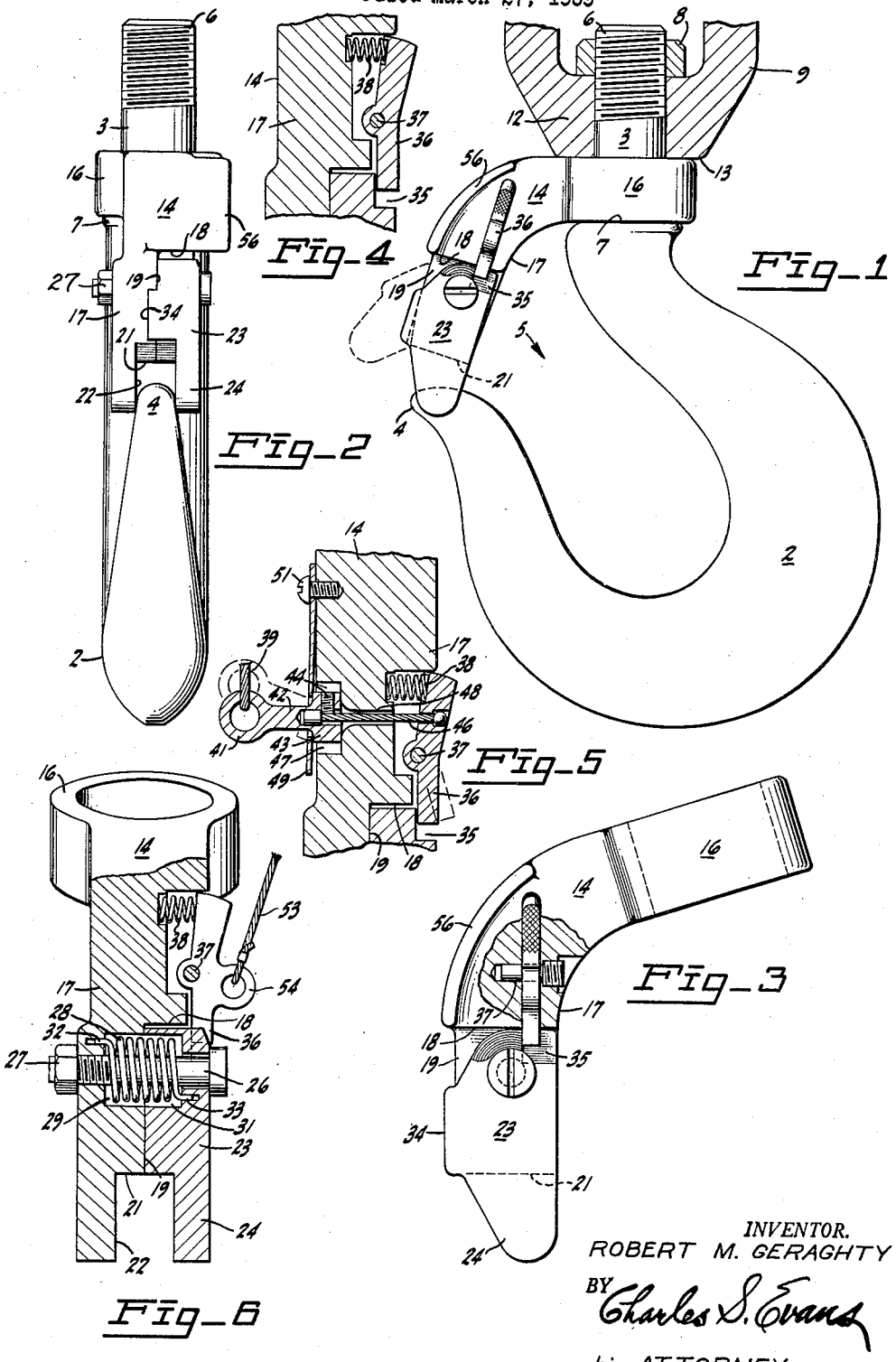

Robert M. Geraghty, Novato, Calif., assignor to E. D. Bullard Company, Sausalito, Calif., a corporation of California
Filed Mar. 27, 1959, Ser. No. 802,403
4 Claims. (Cl. 24—241)

The invention relates to safety hooks, and particularly to a hook having a safety gate releasably lockable in throat closing position.

One of the objects of the invention is the provision of a safety hook in which the safety gate may be locked to or unlocked from the hook tip.

Another object of the invention is the provision of a safety hook having a safety gate which may be opened from a point remote from the hook.

Still another object of the invention is the provision of a safety gate capable of being mounted on conventional safety hooks already in use.

A still further object of the invention is the provision of a safety gate which when unlatched is freely pivotal into open or closed position.

Another object of the invention is the provision of a safety gate capable of being closed and locked or unlocked and opened by the use of only one hand.

The invention possesses other objects some of which with the foregoing will be brought out in the following description of the invention. I do not limit myself to the showing made by the said description and the drawings, since I may adopt variant forms of the invention within the scope of the appended claims.

Referring to the drawings:

FIG. 1 is a side elevation of my safety hook showing the gate locked in closed position across the throat. The unlocked position of the latch is shown in dash lines.

FIG. 2 is a front elevation of the hook.

FIG. 3 is a side elevation of the safety gate removed from the hook. A portion of the gate is broken away to disclose the underlying structure.

FIG. 4 is a fragmentary sectional view of the gate showing the arrangement of spring-pressed pawl and latch.

FIG. 5 is a fragmentary sectional view of the safety gate, showing a modified construction incorporating means for unlatching and opening the gate from a point remote therefrom.

FIG. 6 is a sectional view of the safety gate embodying another modification of the means for unlatching and opening the gate from a point remote therefrom.

Broadly considered, the safety hook of my invention comprises a body of conventional hook shape, having a mounting shank at one end and a freely extending tip at the other end spaced from the shank and therewith defining the throat of the hook. Pivotally mounted on the shank and movable between open and closed position over the throat is a safety gate selectively engageable with and disengageable from the freely extending tip of the hook. Latch means are provided on the gate adjacent one end thereof to securely lock the gate to the hook tip to prevent inadvertent opening of the gate. A pawl fixed on the gate is movable to lock or unlock the latch. A hanger bracket secured to the shank above the gate provides means for attaching the hook to a line.

In more specific detail, the safety hook of my invention comprises a main hook body 2 forged with a cylindrical shank 3 at one end and an outwardly curved freely extending tip 4 at the other end, which with the shank end of the hook body defines the throat 5 of the hook. The outer end portion of the shank 3 is threaded as at 6, and at its base is provided with a shoulder 7. Rotatably mounted on the shank 3, and detachably secured by a nut 8, is a hanger bracket 9 for attaching the hook to the end of a line (not shown). The bottom 12 of the hanger bracket presents a flat annular surface 13 between which and the shoulder 7 is movably interposed a safety gate 14.

The safety gate comprises a curvilinear generally L-shaped bar or arm formed at one end with an integral eye or collar 16 rotatably engaging the shank 3, and held against axial displacement between the shoulder 7 and the surface 13 of the hanger bracket. So confined, the safety gate is rotatable in a plane perpendicular to the axis of the shank to move the freely extending arm portion 17 of the gate into and out of abutting engagement with the tip 4 to close or open the throat of the hook.

As shown best in FIGS. 2 and 6, the outer end portion of the arm 17 is reduced in thickness to provide a shoulder 18 and an adjacent laterally offset flat surface 19, the latter lying in a median plane including the axis of rotation of the gate. A second shoulder 21, formed in the arm between the shoulder 18 and the extreme free end of the arm, provides another flat surface 22 offset laterally from the surface 19. In the position of the gate shown in FIG. 2, it will be seen that when the flat surface 22 impinges against the tip 4 of the hook, a plane through the tip 4 and axis of shank 3 will coincide with a median plane through the gate.

Means are provided for selectively locking or unlocking the gate from the tip of the hook. Mounted for pivotal movement on the flat surface 19 on the gate is a latch 23, having a depending portion 24 of reduced thickness spaced from and opposed to the reduced end of the arm 17. The juxtaposed reduced end portions of the arm and latch thus provide a bifurcation on the free end of the gate within which the tip 4 may be snugly confined. A journal pin 26 threaded into the gate serves as a journal for the latch and retains it snugly against the flat surface 19. A lock nut 27 on the pin insures against inadvertent loosening of the pin. Interposed between the arm 17 and the latch 23 is a coil spring 28. The spring surrounds the pin and is confined within opposed recesses 29 and 31 in the arm 17 and latch, respectively. As shown best in FIG. 6, one end 32 of the spring is fixed to the arm 17, while the other end 33 is fixed to the latch. The spring is conveniently proportioned so that both ends may be engaged and the spring tensioned before the pin 26 is inserted and the latch positioned against flat surface 19. The tension in the spring normally biases or pivots the latch into the open position shown in dash lines in FIG. 1, the extreme open position of the latch being determined by abutment of latch flange 34 against the arm 17 adjacent shoulder 18. Flange 34 also serves to limit closing movement of the latch.

To lock the latch in its tip engaging position, the latch is provided with a groove or notch 35, positioned to be engaged or disengaged by one end of a pawl 36, which is pivotally mounted intermediate its ends on the arm 17, by a pivot pin 37. A spring 38 interposed between the arm 17 and the other end of the pawl, normally pivots the pawl into notch engaging position to retain the latch locked against the tension of spring 28 tending to open it. It will be noted that when the notch 35 has been pivoted into position to be engaged by the pawl, the latch is fully closed, with the latch flange abutting the face of the arm 17. The pawl and latch flange thus cooperate to retain the latch against movement in either direction when the pawl engages the notch.

To disengage the pawl from the latch to permit pivotal movement of the latch to unlock the gate, the end of the pawl associated with the spring 38 is depressed to pivot the opposite end out of the notch in the latch. Upon disengagement of the pawl, the latch is pivoted to its open position by the spring 28, shown best in FIG. 1.

In the embodiment of the invention illustrated in FIGS. 1, 2 and 3, the pawl is adapted to be disengaged from the latch by finger pressure sufficient to compress the spring 38. In the embodiment illustrated in FIG. 5, the pawl is disengaged from the latch by tension applied to a jerk line 39 secured to the eye 41 of a rocker arm 42 having an axially bored cylindrical rocker head 43 at the opposite end. A set screw 44 threaded radially into the rocker head, extends into the bore to detachably lock therein one enlarged end of a flexible wire tension link 46. The rocker head lies within a depression 47 formed in the arm 17, and a passage 48 communicates from the base of the depression through the arm to the opposite side thereof adjacent the pawl. The tension link extends through the passage and its enlarged end remote from the rocker head is fixed to the end of the pawl remote from the latch. As shown in FIG. 5, tension applied to the jerk line 39 will cause the outer end of the rocker arm to be displaced in the direction of pull. This will cause the rocker head 43 to be tilted up on one edge as shown in dash lines in FIG. 5, thus tensioning the link 46 and compressing the spring 38 to disengage the pawl from the notch 35. To return the rocker arm to its original position, a flat leaf spring 49 is superimposed on the rocker head 43 and is fixed to the arm 17 by a screw 51.

In the embodiment of the invention illustrated in FIG. 6, the jerk line 53 is connected directly to an eye 54 integral with and extending from the pawl. This jerk line is provided to unlock the latch from a position remote from the hook, as for instance by the operator of the crane on which the hook is suspended. A rigger on the ground is of course still able to unlock the latch by merely depressing the pawl.

It will thus be seen that the safety hook of my invention is capable of being attached and detached, the safety gate closed and locked or unlocked and opened, with the use of only one hand. Additionally, locking the gate to the tip of the hook results in the gate being able to sustain lateral blows of greater impact than is possible with conventional safety gates which are locked to the shank. Inadvertent movement of the pawl by such a laterally directed blow is prevented in my device by providing an integral flange or lip 56 on the arm 17 projecting outwardly over the pawl.

I claim:

1. A safety hook comprising a body having a shank at one end and a tip at the other end spaced from the shank to provide a throat therebetween, a safety gate pivotally mounted on the shank and rotatable thereon between open and closed positions over the throat, said gate having an integral free end engaging against one side of the tip when in closed position, a latch pivoted on the gate and normally engaged against the opposite side of the tip to lock the gate against opening movement when closed, spring means biasing the latch into an outward and upward swing to clear the throat and tip and unlock the gate, and a spring-pressed pawl pivoted on the gate and normally engaged with the latch to hold it normally locked against the tip.

2. The combination in accordance with claim 1 in which means including a jerk line for operating the pawl from a remote point to release the latch to unlock the gate are arranged on the gate whereby the gate is swung open by continued pressure in the same direction on the pawl operating means.

3. A safety hook comprising a body having a shank at one end and a tip at the other end spaced from the shank to provide a throat therebetween, a safety gate pivotally mounted on the shank and rotatable thereon between open and closed positions over the throat, said gate having an integral free end engaging said one side of the tip when in closed position whereby the gate can swing open on but one side of the tip, a latch pivoted on the gate and normally engaged against the opposite side of the tip to lock the gate against opening movement when closed, spring means biasing the latch into an outward and upward swing to clear the throat and tip and unlock the gate, and a spring-pressed pawl having a free end and pivoted on the gate and normally engaged at its other end with the latch to hold it normally locked against the tip, said pawl being pivoted between its engaged end and its free end so that pressure applied to the free end first releases the pawl and then swings the gate open.

4. The combination in accordance with claim 3 in which means for operating the pawl from a remote point include a rocker arm mounted for universal movement on the gate.

References Cited in the file of this patent

UNITED STATES PATENTS

| | | |
|---|---|---|
| 393,952 | Wood et al. | Dec. 4, 1888 |
| 1,636,209 | Bergsten | July 19, 1927 |
| 2,490,931 | Thompson | Dec. 13, 1949 |
| 2,603,524 | Amelung | July 15, 1952 |
| 2,796,651 | Ratcliff | June 25, 1957 |
| 2,853,760 | Burnham | Sept. 30, 1958 |
| 2,866,247 | Ciegg | Dec. 30, 1958 |
| 2,905,997 | Ramskill | Sept. 29, 1959 |